United States Patent
Shah et al.

(10) Patent No.: US 8,917,595 B2
(45) Date of Patent: Dec. 23, 2014

(54) METHOD AND SYSTEM FOR A DISTRIBUTED PLATFORM SOLUTION FOR SUPPORTING CIM OVER WEB SERVICES BASED MANAGEMENT

(75) Inventors: Hemal Shah, Trabuco Canyon, CA (US); Robert R. Swindell, Norco, CA (US)

(73) Assignee: Broadcom Corporation, Irvine, CA (US)

( * ) Notice: Subject to any disclaimer, the term of this patent is extended or adjusted under 35 U.S.C. 154(b) by 629 days.

(21) Appl. No.: 11/968,335

(22) Filed: Jan. 2, 2008

(65) Prior Publication Data

US 2008/0170498 A1 Jul. 17, 2008

Related U.S. Application Data

(60) Provisional application No. 60/884,442, filed on Jan. 11, 2007.

(51) Int. Cl.
*H04L 12/24* (2006.01)

(52) U.S. Cl.
CPC .......... *H04L 41/046* (2013.01); *H04L 41/0273* (2013.01)
USPC .......................................... 370/230; 709/223

(58) Field of Classification Search
CPC .................................................. H04L 41/0273
USPC ............ 370/230, 522; 709/223; 717/130–136
IPC .................................................... H04L 41/0273
See application file for complete search history.

(56) References Cited

U.S. PATENT DOCUMENTS

| | | | |
|---|---|---|---|
| 6,757,725 B1 | 6/2004 | Frantz et al. | |
| 8,150,953 B2 * | 4/2012 | Mittapalli et al. | 709/223 |
| 2002/0016861 A1 | 2/2002 | Simonoff | |
| 2002/0165978 A1 | 11/2002 | Chui | |
| 2003/0023559 A1 | 1/2003 | Choi et al. | |
| 2003/0058800 A1 | 3/2003 | Goodman et al. | |
| 2003/0099305 A1 | 5/2003 | Yi et al. | |
| 2003/0119555 A1 | 6/2003 | Friesen et al. | |
| 2003/0122683 A1 | 7/2003 | Downer | |
| 2003/0179712 A1 | 9/2003 | Kobayashi et al. | |
| 2004/0100964 A1 | 5/2004 | Robotham et al. | |
| 2004/0156350 A1 | 8/2004 | Brasic et al. | |
| 2004/0179546 A1 * | 9/2004 | McDaniel et al. | 370/463 |
| 2006/0089750 A1 * | 4/2006 | Basham et al. | 700/245 |
| 2006/0129675 A1 * | 6/2006 | Zimmer et al. | 709/225 |
| 2006/0136338 A1 * | 6/2006 | Maor | 705/51 |
| 2007/0233455 A1 * | 10/2007 | Zimmer et al. | 703/27 |
| 2008/0033972 A1 * | 2/2008 | Yin et al. | 707/101 |
| 2008/0084886 A1 * | 4/2008 | Cooley | 370/395.5 |

* cited by examiner

*Primary Examiner* — Benjamin Lamont
(74) *Attorney, Agent, or Firm* — Oblon, Spivak, McClelland, Maier & Neustadt, L.L.P.

(57) ABSTRACT

A portion of management traffic, carried via network traffic, and received and/or transmitted via a network controller, may be processed externally to the network controller. A pass-through driver may be utilized, in the network controller, to enable transparent routing of management traffic that may be processed externally. The externally processed management traffic may comprise WS-Management based messaging, while management traffic that may comprise ASF based messaging may be processed internally in the network controller. An application processor may be utilized to perform external processing of received and/or transmitted management traffic. A management bus may be utilized to enable routing of management traffic processed external to the network controller. The management bus may also be utilized to enable platform operations during processing of management traffic. The application processor may invoke, via the management bus and/or the pass-through driver, platform based functionality maintained via the network controller.

18 Claims, 9 Drawing Sheets

METHOD AND SYSTEM FOR A DISTRIBUTED PLATFORM SOLUTION FOR SUPPORTING CIM OVER WEB SERVICES BASED MANAGEMENT

CROSS-REFERENCE TO RELATED APPLICATIONS/INCORPORATION BY REFERENCE

This patent application makes reference to, claims priority to and claims benefit from U.S. Provisional Application Ser. No. 60/884,442 filed on Jan. 11, 2007.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to network management. More specifically, certain embodiments of the invention relate to a method and system for a distributed platform solution for supporting CIM over web services based management.

BACKGROUND OF THE INVENTION

Information Technology (IT) management may require performing remote management operations of remote systems to perform inventory and/or to determine whether remote systems are up-to-date. For example, management devices and/or consoles may perform such operations as discovering and/or navigating management resources in a network, manipulating and/or administrating management resources, requesting and/or controlling subscribing and/or unsubscribing operations, and executing and/or specific management methods and/or procedures. Management devices and/or consoles may communicate with devices in a network to ensure availability of remote systems, to validate that systems may be up-to-date, and/or to perform any security patch updates that may be necessary.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a distributed platform solution for supporting CIM over web services based management, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a distributed platform solution for supporting CIM over web services based management. In a device that may participate in network management operations, a portion of management traffic, carried via network traffic, and received and/or transmitted via a network controller, may be processed externally to the network controller. A pass-through driver may be utilized, in the network controller, to enable transparent routing of management traffic that may be processed externally. The externally processed management traffic may comprise Web Service Management (WS-Management) based messaging. Additionally, management traffic that may comprise Alert Standard Format (ASF) based messaging may be processed internally in the network controller. An application processor may be utilized to perform external processing of received and/or transmitted management traffic. A management bus may be utilized to enable routing of management traffic that may be processed externally to the network controller. The management bus may also be utilized to enable interaction with managed components, subsystems, and/or application during processing of management traffic via the network controller and/or the application processor. During external management traffic processing, the application processor may invoke, via the management bus and/or the pass-through driver, platform based functionality that may be maintained via the network controller.

Figure 1A:
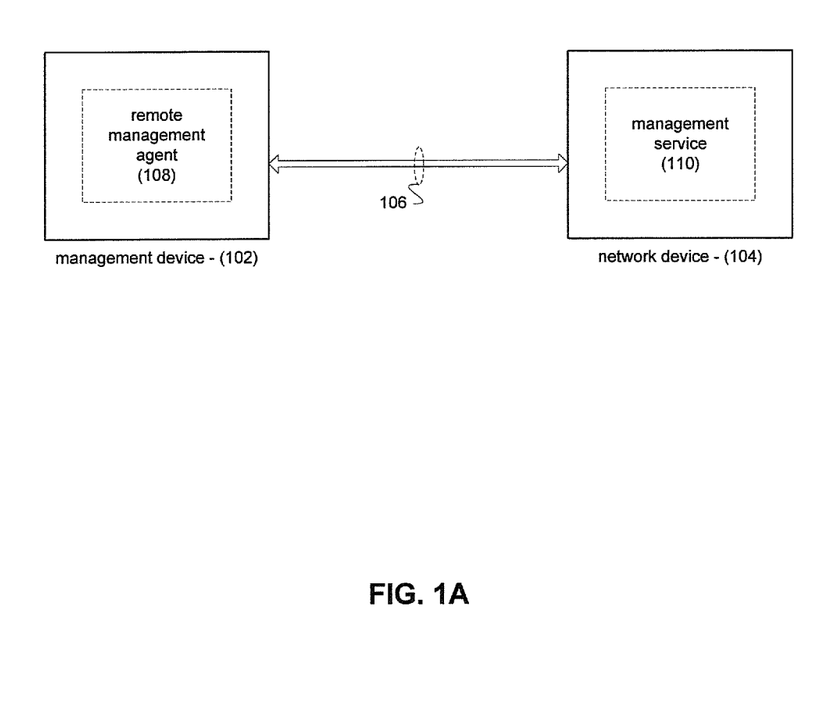
FIG. 1A is a block diagram that illustrates an exemplary communication setup between a management device and a network device, which may be utilized in accordance with an embodiment of the invention.

FIG. 1A is a block diagram that illustrates an exemplary communication setup between a management device and a network device, which may be utilized in accordance with an embodiment of the invention. Referring to FIG. 1A, there is shown a management device 102, a network device 104, a management connection 106, a remote management agent 108, and a management service 110.

The management device 102 may comprise suitable logic, circuitry, and/or code that may enable management of network devices, for example the network device 104, via a management connection, for example the management connection 106. For example, the management device 102 may be utilized by Information Technology (IT) operators to enable management of various devices in an IT network. The management device 102 may also comprise a dedicated entity, for example the remote management agent 108, to enable performing management operations, which may comprise discovering and/or navigating management resources in a network, manipulating and/or administrating management resources, requesting and/or controlling subscribing and/or unsubscribing operations, and executing and/or specific management methods and/or procedures. The management device 102 may perform management operations, via the remote management agent 108 for example, wherein the management device 102 may communicate with devices in a network to ensure availability of remote systems, to validate that systems may be up-to-date, and/or to perform any security patch updates that may be necessary.

The remote management agent 108 may comprise suitable logic, circuitry, and/or code that may enable performing management operations based on one or more management standards. For example, the remote management agent 108 may enable performing control and/or management operations, based on Web Service Management (WS-Management) and/or Alert Standard Format (ASF) protocols, of existing and/or known nodes, which support similar protocols, in a network. The remote management agent 108 may comprise a logical and/or software entity that may be integrated within an OS running in the management device 102. The remote management agent 108 may comprise a logical and/or software entity that may be integrated within a general network controller (NIC) which may be running in the management device 102. The remote management agent 108 may comprise a logical and/or software entity that may be integrated within a network controlled running within a dedicated management sub-system within the management device 102.

The network device 104 may comprise suitable logic, circuitry, and/or code that may enable management by one or more management devices, for example the management device 102, via a management connection, for example the management connection 106. The network device 104 may be integrated into a network that may be managed by the management device 102. For example, the network device 104 may comprise a personal computer (PC), which may be operated in a network managed by the management device 102. Additionally, the network device 104 may also comprise a dedicated entity, for example the management service 110, to enable participating in management operations.

The management service 110 may comprise logic, circuitry, and/or code that may enable performing management operation based on one or more management standards. For example, the management service 110 may enable participating in control and/or management operations, based on WS-Management and/or ASF protocols. The management service 110 may comprise a logical and/or software entity that may be integrated within an OS running in the network device 104. The management service 110 may also comprise a logical and/or software entity that may be integrated within a general network controller (NIC) which may be running in the network device 104. Additionally, the management service 110 may comprise a logical and/or software entity that may be integrated within a network controlled running within a dedicated management sub-system within the network device 104.

The management connection 106 may comprise network interface and/or link that may enable management interactions and/or traffic between management devices, for example the management device 102, and network devices such as the network device 104. For example, the management connection may comprise a network connection, for example Ethernet (IEEE 802.3), which may enable the management device 102 and/or the network device 104 to exchange management messaging via Ethernet packets.

In operation, the management connection 106, via network traffic, may utilize one or more standards-based management protocols to enable performing management operations between the management device 102 and the network device 104. For example, the remote management agent 108 and/or the management service 110 may enable utilizing WS-management and/or ASF messaging, via the management connection 106, to enable management operations between the management device 102 and the network device 104.

The management connection 106 may comprise use of one or more management protocols specified and/or published by standards entities such as the Distributed Management Task Force (DMTF). The management connection 106 may comprise utilizing DMTF-based Alert Standard Format (ASF) protocol messaging and/or WS-Management (WS-Man) protocol messaging. The Alert Standard Format (ASF) protocol may be utilized in first generation out-of-band management systems. The ASF protocol may comprise utilization of User Datagram Protocol (UDP) stack to enable communication between management devices and network devices. Devices comprising ASF functionality and/or interface may be ASF capable, wherein said devices may perform management operations via ASF messages. For example, in instances where the network device 104 may be ASF capable, the management device 102 may utilize ASF based messaging to perform management of the network device 104.

More recently, WS-Management (WS-MAN) was proposed and developed as the next generation management protocol. The WS-Management is a specification based on Web Services, which typically utilize SOAP (XML based messaging) and HTTP(S) as a SOAP transport for communications. SOAP over HTTP(S) may require HTTP/TLS/TCP stack implementation, which may ensure improved security, reliability, and OS-independence. The DASH, a DMTF management standard work group, has defined a Common Information Model (CIM) based instrumentation, analogous to object oriented representation of management data, of a managed subsystem that may be accessed using the WS-Management protocol. Devices that may comprise Intelligent Platform Management Interface (IPMI) or ASF internal interfaces/protocols may be capable, wherein said devices may be managed, out-of-band, via WS-Management messages. For example, in instances where the network device 104 may comprise IPMI or ASF based internal communications within the components of the network device 104, the management device 102 may utilize WS-Management based messaging to perform management of the network device 104.

Consequently, UDP and/or TCP based communication, via the management connection 106, may be transmitted and/or received between the management device 102 and the network device 104 during ASF and/or WS-Management based operations. The management device 102 and/or the network device 104 may utilize network cards (NIC) to enable sending and/or receiving network traffic via the management connection 106. The network controller that may be utilized in the management device 102 and/or the network device 104 may process network traffic that may comprise ASF and/or WS-Management based messaging, which may be transmitted and/or received via UDP and/or TCP packets, respectively.

In an embodiment of the invention, at least a portion of processing of network traffic that may comprise WS-Management messaging may be performed externally to network controllers in the management device 102 and/or the network device 104. External processing of WS-Management messaging may enable utilizing dedicated processors, which may be loaded and/or updated with the WS-Management based functionality, for example; and may also enable compatibility with various types of available network controllers.

Figure 1B:
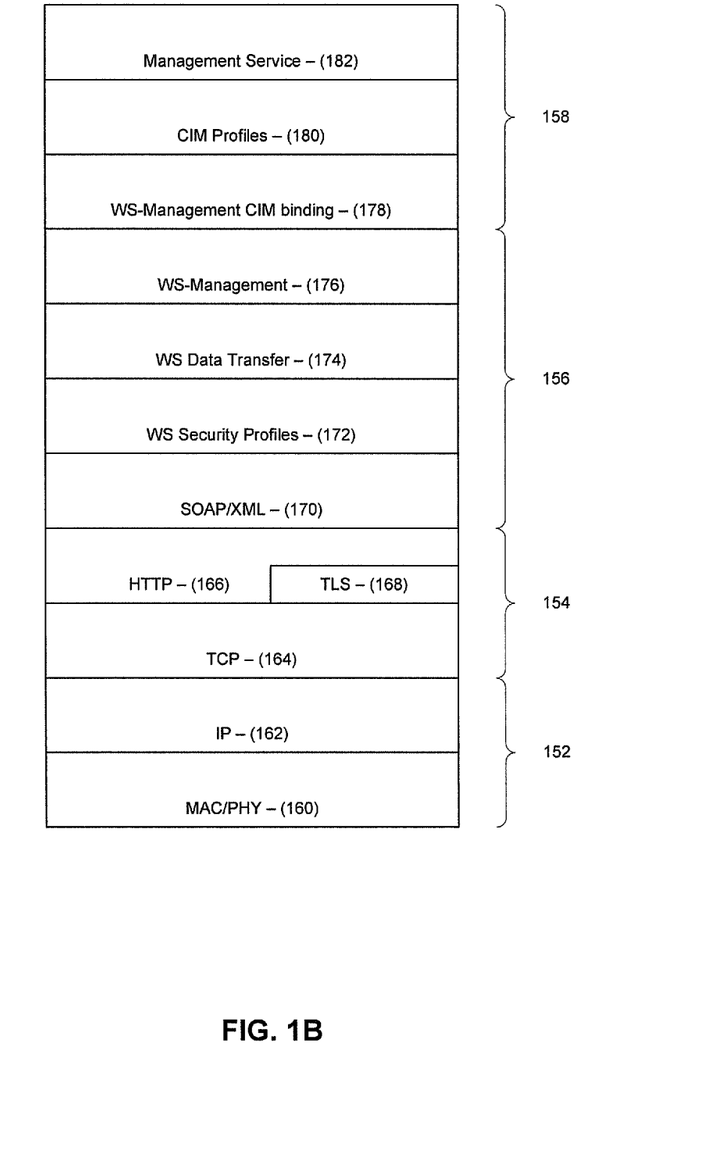
FIG. 1B is a block diagram illustrating an exemplary protocol stack diagram for WS-Management based, CIM bound, service, in accordance with an embodiment of the invention.

FIG. 1B is a block diagram illustrating an exemplary protocol stack diagram for WS-Management based, CIM bound, service, in accordance with an embodiment of the invention. Referring to FIG. 1B, there is shown a WS-Management stack 150 that may comprise physical/network layers 152, Simple Object Access Protocol (SOAP) transport layers 154, Web-Service (WS) layers 156, applications/profiles layers 158, a Medium Access Control/Physical (MAC/PHY) layer 160, an Internet Protocol (IP) layer 162, a Transmission Control Protocol (TCP) layer 164, a Hyper Test Transfer Protocol (HTTP) layer 166, a Transport Layer Security (TLS) layer 168, a Simple Object Access Protocol (SOAP)/XML layer 170, a Web-Services (WS) security profiles layer 172, a Web-Services (WS) data transfer layer 174, a WS-Management layer 176, a WS-Management CIM binding layer 178, a CIM profiles layer 180, and a management service 182.

Utilizing the WS-Management stack 150 may enable generating and/or processing the WS-Management based data and/or messaging that may be utilized to request and/or perform management services based on CIM binding. The WS-management stack 150 may be based on the WS-Management services standards.

The physical/network layers 152 may comprise layers that may enable such functionality as physical transmission and/or reception of network traffic packets. The MAC/PHY layer 160 may comprise functionality that may enable use of physical link and/or channel allocation and management, for example. Additionally, because the WS-Management messaging may utilize TCP based communication, the physical/network layers 152 may also comprise the IP layer 162 to enable performing TCP communication.

The SOAP transport layers 154 may enable performing transport related functionality on SOAP based messages, which may be utilized to transmit and/or receive the WS-Management based data and/or messaging via network traffic. The SOAP transport layers 154 may comprise the TCP layer 164, HTTP layer 166, and/or the TLS layer 168. The TCP layer 164 may enable handling TCP messages, which may comprise adding TCP headers to transmitted messages, and/or extracting TCP data from received messages. The HTTP layer 166 may enable performing HTTP based functionality on messages that may utilize the HTTP 1.1 protocol, for example, to establish request and response server-client like connectivity, for example. Within the HTTP functionality, the TLS layer 168 may enable performing security operations on HTTP messages, which may comprise as encryption and/or decryption of HTTP messaging, for example.

The Web-Service (WS) layers 156 may enable performing handling of WS-Management based messaging. The WS layers 156 may comprise the SOAP/XML layer 170, the WS security profiles layer 172, the WS data transfer layers 174, and/or the WS-Management layer 176. The SOAP/XML layer 170 may enable handling SOAP XML-based messaging utilized to transmit and/or receive WS-Management based messaging via the HTTP layer 166. The WS security profiles layer 172 may comprise security definitions and/or mechanisms that may be specific to WS-management services. The WS data transfer layer 174 may comprise data transfer definitions and/or mechanisms that may be specific to WS-management services. For example, the WS data transfer layer 174 may comprise standards-based WS-transfer, WS-Enumeration, and/or WS-Eventing for transferring the management information. The WS-Management layer 176 may comprise definitions and/or mechanisms that may be utilized to process, generate, and/or read WS-Management based messaging.

The applications/profiles layers 158 may enable handling of application and/or profiles based messaging that may be performed via WS-Management. The applications/profiles layers 158 may comprise the WS-Management CIM binding layer 178, the CIM profiles layer 180, and/or the management service 182. The WS-Management CIM binding layer 178 may enable handling of WS-Management messaging that may enable determining the appropriate CIM binding corresponding to data description in received and/or transmitted WS-Management messaging. The CIM profiles layer 180 may enable utilizing appropriate CIM profiles that may enable performing and/or requesting one or more management operations and/or services. The management service 182 may enable performing and/or requesting management services.

Figure 2A:
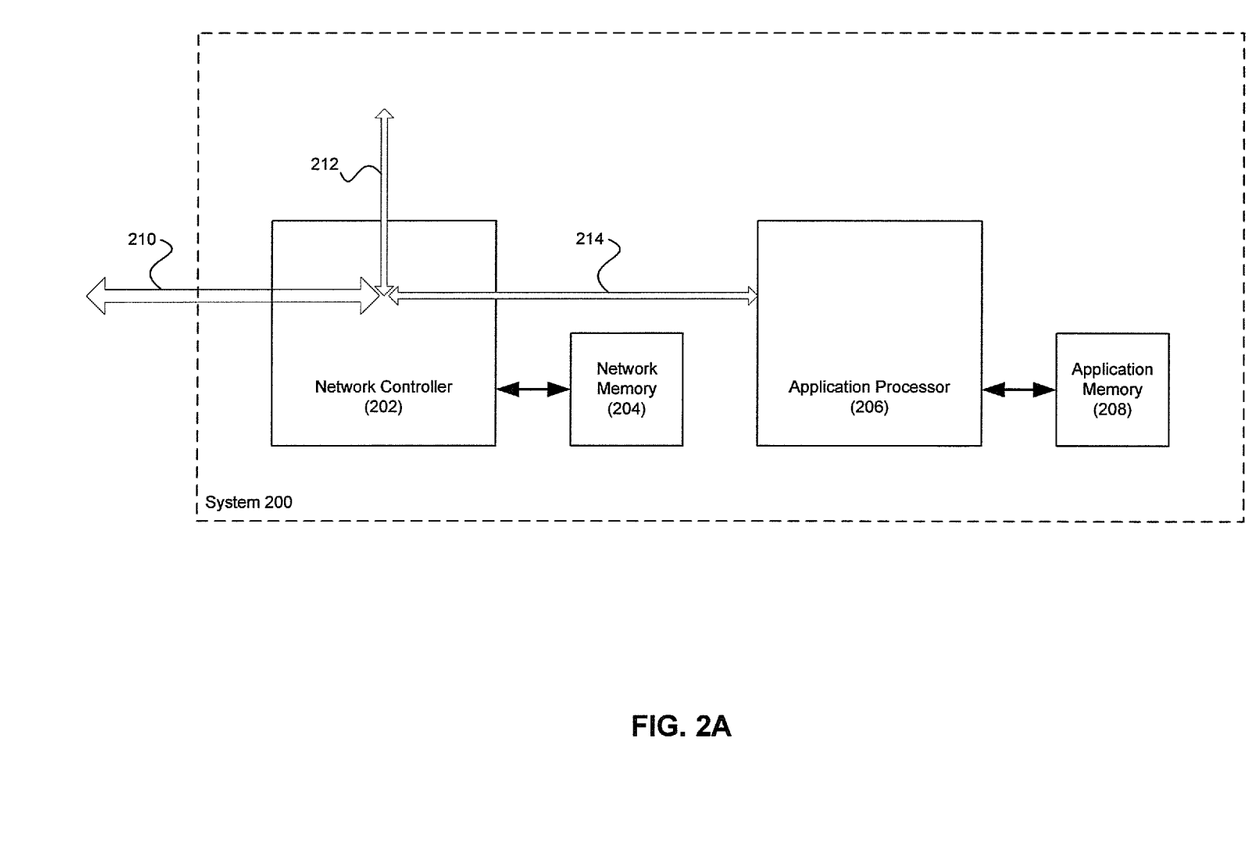
FIG. 2A is a block diagram that illustrates an exemplary system that comprises a network controller and an application processor, which may be utilized to enable external processing of WS-Management based traffic, in accordance with an embodiment of the invention.

FIG. 2A is a block diagram that illustrates an exemplary system that comprises a network controller and an application processor, which may be utilized to enable external processing of WS-Management based traffic, in accordance with an embodiment of the invention. Referring to FIG. 2A, there is shown a system 200, a network controller 202, a network memory 204, an application processor 206, an application memory 208, a network traffic 210, a host traffic 212, and a management traffic 214.

The system 200 may comprise the network controller 202, the network memory 204, the application processor 206, the application memory 208, and may also comprise suitable logic, circuitry, and/or code that may enable participating in management operation based on one or more management standards. For example, system 200 may be integrated in the management device 102 and/or the network device 104 to enable performing WS-Management and/or ASF management operations, substantially as described in FIG. 1A.

The network controller 202 may comprise suitable logic, circuitry, and/or code that may enable handling of network traffic, for example the network traffic 210, which may be received and/or transmitted by the system 200. The network memory 204 may comprise suitable logic, circuitry, and/or code that may enable storage and/or retrieval of data and/or code, which may be utilized by the network controller 202, for example. In this regard, the network memory 204 may comprise different memory technologies, including, for example, non-volatile random access memory (NVRAM) and/or Flash memory.

The application processor 206 may comprise suitable logic, circuitry, and/or code that may enable processing of management traffic, received and/or transmitted via the network controller 202 for example, which may be based on a specific management standard including, for example, WS-Management. The application memory 208 may comprise suitable logic, circuitry, and/or code that may enable storage and/or retrieval of data and/or code, which may be utilized by the application processor 206, for example. In this regard, the application memory 208 may comprise different memory technologies, including, for example, non-volatile random access memory (NVRAM) and/or Flash memory.

The network traffic 210 may comprise received and/or transmitted packets communicated via a network connection, which may comprise, for example, an Ethernet (IEEE 802.3) connection. The traffic 210 may comprise the host traffic 212 and/or management traffic 214. The host traffic 212 may comprise data transmitted and/or received by subsystems and/or application in the system 200. For example, the host traffic 212 may comprise data transmitted by web browsing applications that may be running in the network device 104. The management traffic 214 may comprise data and/or messages transmitted and/or received in the system 200 during management operations. For example, the management traffic 214 may comprise WS-Management based messaging communicated via the system 200 to enable performing WS-Management services.

In operations, the network controller 202 may enable processing network traffic 210. The network controller 202 may utilize the network memory 204 to retrieve and/or store data and/or code that may be utilized during processing of network traffic 210. The application processor 206 may be utilized, in the system 200, to enable external processing of management traffic 214 transmitted and/or received via the network controller 202 in the system 200. The application processor 206 may utilize the application memory 208 to retrieve and/or store data and/or code that may be utilized during processing of management traffic 214.

During downlink operations, where the network controller 202 may be utilized to enable processing of network traffic 210 received in the system 200, the network controller 202 may determine whether received traffic is host traffic 212 and/or management traffic 214. In the downlink direction, the host traffic 212 may be forward from the network controller 202 to appropriate subsystems, devices, and/or application in the system 200. In the downlink direction, the management traffic 214 may be forwarded to the application processor 206 to enable processing of received management data and/or messages in the system 200, via the application processor 206.

During uplink operations, in instances where the network controller 202 may be utilized to enable processing network traffic 210 transmitted from the system 200, the network controller 202 may enable forwarding uplink host traffic 212 and/or uplink management traffic 214. In the uplink direction, the host traffic 212 may be received by the network controller 202, from appropriate subsystems, devices, and/or application in the system 200, and may be processed to enable transmission via a network connection, for example an Ethernet (IEEE 802.3) connection, that may be available in the system 200. In the uplink direction, the management traffic 214 may be received by the network controller 202, from the application processor 206, and may then be processed to enable transmission by the network controller 202 via a network connection, for example an Ethernet (IEEE 802.3) connection.

In an embodiment of the invention, a portion of management traffic received and/or transmitted via the network traffic 210 may be processed wholly within the network controller 202. For example, received and/or transmitted ASF based management messaging may be processed within the network controller 202.

Figure 2B:
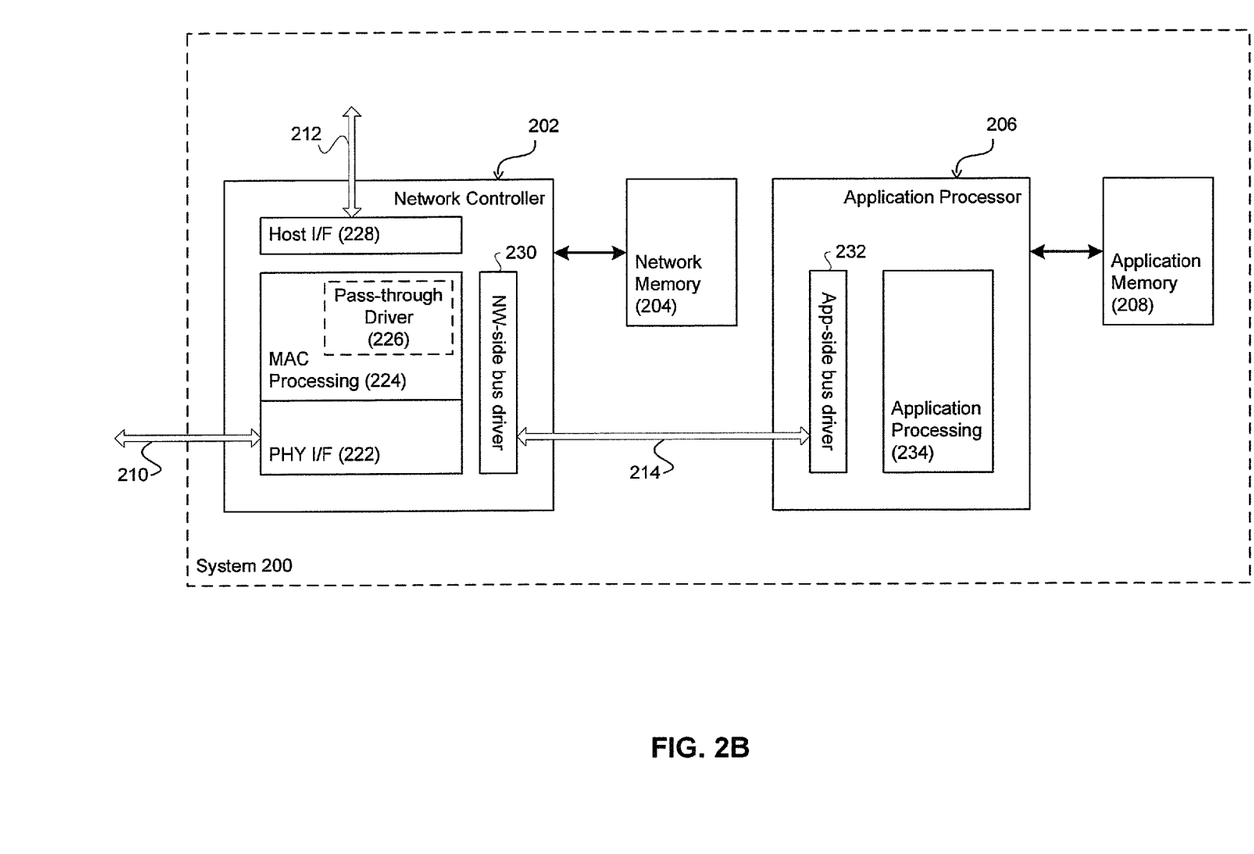
FIG. 2B is a block diagram illustrating communication setup within an exemplary system that comprises a network controller and an application processor, which may be utilized to enable external processing of WS-Management based traffic, in accordance with an embodiment of the invention.

FIG. 2B is a block diagram illustrating communication setup within an exemplary system that comprises a network controller and an application processor, which may be utilized to enable external processing of WS-Management based traffic, in accordance with an embodiment of the invention. Referring to FIG. 2B, there is shown the system 200, the network controller 202, the network memory 204, the application processor 206, the application memory 208, the network traffic 210, the host traffic 212, the management traffic 214, a physical layer (PHY) interface 222, a medium access control (MAC) processing block 224, a host interface 228, a pass-through driver 226, a network-side bus driver 230, an application-side bus driver 232, and an application processing block 234.

With reference to the system 200, the network controller 202, the network memory 204, the application processor 206, the application memory 208, the network traffic 210, the host traffic 212, and the management traffic 214 may be comprised substantially as described in FIG. 2A.

The PHY interface 222 may comprise suitable logic, circuitry, and/or code that may enable transmission and/or reception of bits, which may correspond to transmitted and/or received network packets, via physical links that may be based on one or more a network connectivity standard. For example, the PHY interface 222 may comprise an Ethernet (IEEE 802.3) physical layer interface.

The MAC processing block 224 may comprise logic, circuitry, and/or code that may enable performing medium access control processing operations. The MAC processing block 224 may be enabled to perform MAC addressing and/or channel access management operations, which may be based on one or more specific network connectivity standards. For example, in instances where the network traffic may be transmitted and/or received via Ethernet (IEEE 802.3) connection, the MAC processing block 224 may enabled performing MAC operations based on the Carrier Sense Multiple Access With Collision Detection (CSMA/CD) protocol. The MAC processing bock 224 may also comprise additional processing functionality that may be necessary to enable transmission and/or reception of network traffic, via the network controller 202, which may originate from and/or be targeted for specific subsystem, devices, and/or other applications within the system 200. For example, the MAC processing block 224 may comprise the pass-through driver 226 to enable forwarding and/or receiving management traffic 214, via the network-side bus driver 230 and/or the application-side bus driver 232.

The pass-through driver 226 may comprise suitable logic, circuitry, and/or code that may enable routing of management traffic 214, transmitted and/or received via network controller 202, to and/or from the application processor 206. For example, the pass-through driver 226 may enable forwarding data packets, which may comprise WS-Management based services data and/or messages, that may be generated after initial PHY and/or MAC processing of received Ethernet packets for example, to the application processor 206. Similarly the pass-through driver 226 may enable reception of data packets, that may comprise WS-Management based services data and/or messages from the application processor 206, and may route the received data packets within the network controller 202 to enable applying necessary MAC and/or PHY processing prior to transmission via network traffic 210.

The host interface 228 may comprise suitable logic, circuitry, and/or code that may enable transmission and/or reception of data between the network controller 202 and subsystems, devices, and/or applications in the system 200 utilizing an inter-system link and/or bus. For example, the host interface 228 may enable utilizing a Peripheral Component Interconnect Express (PCI-E) bus, for example, to route the host traffic 212 to and/or from the network controller 202.

The network-side bus driver 230 may comprise suitable logic, circuitry, and/or code that may enable transmission and/or reception of management traffic 214, in the network controller 202, utilizing an inter-system bus. Similarly, the application-side bus driver 232 may comprise suitable logic, circuitry, and/or code that may enable transmission and/or reception of management traffic 214, in the application processor 206, utilizing an inter-system bus. For example, the network-side bus driver 230 and/or application-side bus driver 232 may enable utilizing a System Management Bus (SMBus) to route the management traffic 214 between the network controller 202 and the application processor 206.

In operation, received and/or transmitted management traffic 214, which may processed via the application processor 206, may be routed via the pass-through driver 226. Received Ethernet packets, for example, which may comprise WS-Management based data and/or messaging, may be processed initially in the network controller 202. For example, the PHY interface 222 and/or the MAC processing block 224 may enable performing MAC/PHY layer 160 processing. The resultant data packets may be forwarded, via the pass-through driver 226, and/or the network-side bus driver 230 and/or the application-side bus driver 232, to the application processor 206. Data packets that may be transmitted from the application processor 206 may be forwarded, via the pass-through driver 226, and/or the network-side bus driver 230 and/or the application-side bus driver 232, to the network controller 202. The Received data packets may then be converted to network packets, for example Ethernet packets, where the PHY interface 222 and/or the MAC processing block 224 may enable performing MAC/PHY layer 160 processing before transmission.

Figure 2C:
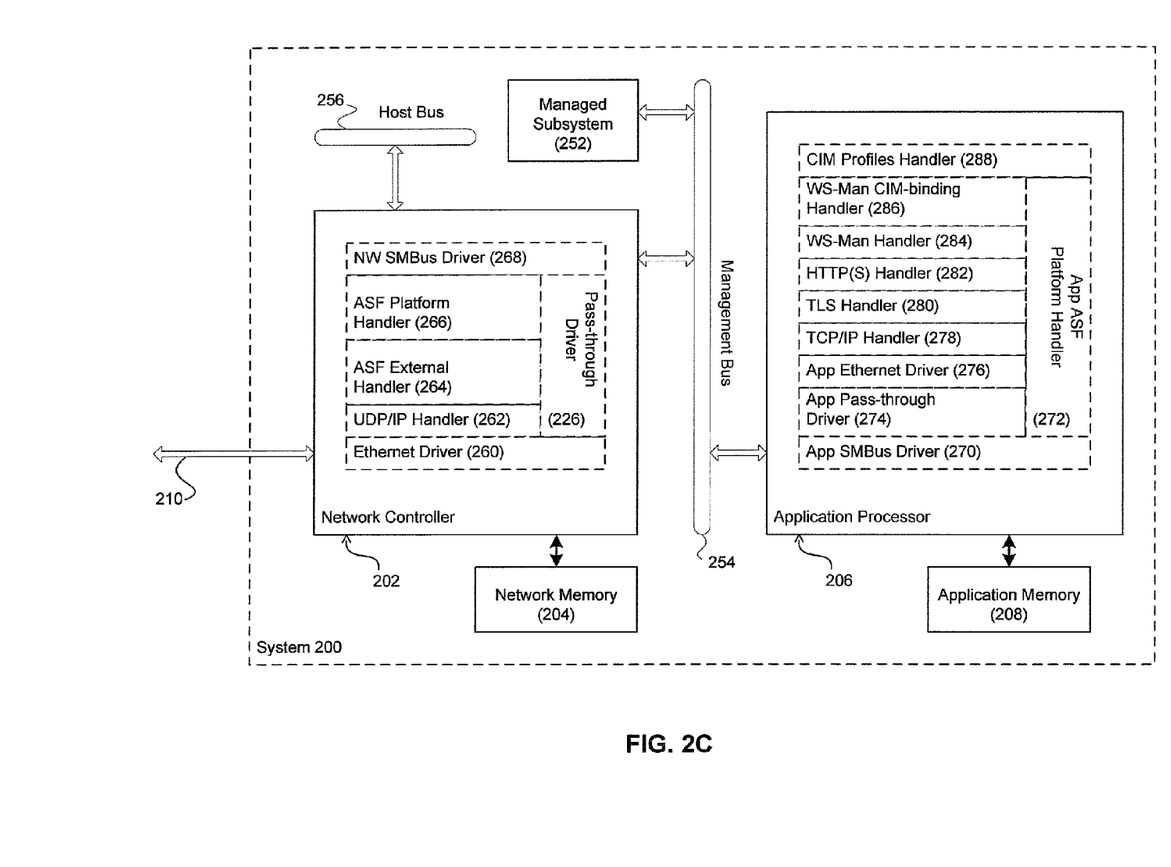
FIG. 2C is a block diagram illustrating splitting of functional processing within an exemplary system that comprises a network controller and an application processor, which may be utilized to enable external processing of WS-Management based traffic, in accordance with an embodiment of the invention.

FIG. 2C is a block diagram illustrating splitting of functional processing within an exemplary system that comprises a network controller and an application processor, which may be utilized to enable external processing of WS-Management based traffic, in accordance with an embodiment of the invention. Referring to FIG. 2C, there is shown the system 200, the network controller 202, the network memory 204, the application processor 206, the application memory 208, the network traffic 210, the pass-through driver 226, a managed subsystem 252, a management bus 254, a host bus 256, an Ethernet driver 260, UDP/IP handler 262, an ASF external handler 264, an ASF platform handler 266, a network SMBus driver 268, an application SMBus driver 270, an application ASF platform handler 272, an application pass-through driver 274, an application Ethernet driver 276, a TCP/IP handler 278, a TLS handler 280, a HTTP(S) handler 282, a WS-Management handler 284, a WS-Management CIM binding handler 286, and a CIM profiles handler 288.

The system 200, the network controller 202, the network memory 204, the application processor 206, the application memory 208, the network traffic 210, and the pass-through driver 226 may be substantially as described in FIG. 2A and FIG. 2B.

The managed subsystem 252 may comprise suitable logic, circuitry, and/or code that may be controlled, managed, and/or utilized during management operations in the system 200. For example, the managed subsystem 252 may comprise Basic Input/Output System (BIOS), chipset, and/or sensors in the system 200. The management bus 254 may comprise suitable logic, circuitry, and/or code that may enable transferring of data and/or messaging between the network controller 202, the application processor 204, and/or the managed subsystem 252 during management operations. For example, the management bus 254 may comprise a SMBus. The host bus 256 may comprise suitable logic, circuitry, and/or code that may enable transfer of data between the network controller 202 and other components of the system 200 during non-management operations. For example, the host bus may comprise a Peripheral Component Interconnect Express (PCI-E) bus that may enable transfer of host traffic 212 via the network controller 202.

The Ethernet driver 260 may comprise suitable logic, circuitry, and/or code that may enable processing messaging that may be transmitted and/or received, by components, subsystems, and/or devices integrated within the system 200, utilizing a network interface that may be based on one or more standards, for example Ethernet. The UDP/IP handler 262 may comprise suitable logic, circuitry, and/or code that may enable performing Internet Protocol (IP) layer 162 and/or Datagram Protocol (UDP) layer functionality processing. The network SMBus driver 268 may comprise suitable logic, circuitry, and/or code that may enable utilizing a management-related bus, for example management bus 254, in the network controller 202 during management-related operations.

The ASF external handler 264 may comprise suitable logic, circuitry, and/or code that may enable handling Alert Standard Format (ASF) 2.0 alerting and/or remote management and/or management functionality. For example, the ASF external handler 264 may comprise functionality that may enable messaging processing based on Platform Event Trap/Simple Network Management Protocol (PET/SNMP) and/or Remote Management Control Protocol (RMCP/RSP) protocols. The ASF platform handler 266 may comprise suitable logic, circuitry, and/or code that may enable handling platform communication functionality during ASF-based management operations. For example, the ASF platform handler 266 may comprise functionality that may enable performing, via System Management BIOS (SMBIOS) for example, alert-related, boot, and/or sensor/device polling operations.

The application SMBus driver 270 may comprise suitable logic, circuitry, and/or code that may enable utilizing a management-related bus, for example management bus 254, in the application processor 206 during management-related operations. The application ASF platform handler 272 may comprise suitable logic, circuitry, and/or code that may enable handling and/or performing ASF-based platform operations during WS-Management based management operations. For example, the application ASF platform handler 272 may comprise functionality that may enable utilizing the ASF platform handler 266, via the management bus 254 for example, to invoke necessary functionality to interact, manage, and/or control the managed subsystem 252.

The application pass-through driver 274 may comprise suitable logic, circuitry, and/or code that may enable transport of data and/or messaging that may be processed in the application processor 206, wherein the transported data and/or messaging may be transmitted and/or received, by the network controller 202 for example, via a network interface. The application Ethernet driver 276 may comprise suitable logic, circuitry, and/or code that may enable processing messaging that may be transmitted and/or received via network drivers that may be available in the system 200. The TCP/IP handler 278 may comprise suitable logic, circuitry, and/or code that may enable performing the Internet Protocol (IP) layer 162 and/or the Transmission Control Protocol (TCP) layer 164 functionality processing. The TLS handler 280 may comprise suitable logic, circuitry, and/or code that may enable performing the Transport Layer Security (TLS) layer 168 functionality processing. The HTTP(S) handler 282 may comprise suitable logic, circuitry, and/or code that may enable performing the Hyper Test Transfer Protocol (HTTP) layer 166 functionality processing.

The WS-Management handler 284 may comprise suitable logic, circuitry, and/or code that may enable performing the WS-Management layer 176 functionality processing. The WS-Management CIM binding handler 286 may comprise suitable logic, circuitry, and/or code that may enable performing the WS-Management CIM binding layer 178 functionality processing. The CIM profiles handler 288 may comprise suitable logic, circuitry, and/or code that may enable performing the CIM profiles layer 180 functionality processing.

In operation, processing of data, messaging, and management operations, in system 200, may be split between the network controller 202 and the application processor 206 to enable external processing of WS-Management based traffic in the network controller 202. Non-management data and/or messaging, which may be carried via the network traffic 210, may be received and/or transmitted via the Ethernet driver 260, and may communicated between the network controller 202 and appropriate subsystems, devices, and/or components in the system 200 via the host bus 256.

Inbound WS-Management data and/or messaging, which may be carried via the network traffic 210, may be received via Ethernet driver 260, as Ethernet packets for example. Once identified as WS-Management based traffic, the received data may be forwarded to the application processor 206 via the pass-through driver 226, the SMBus driver 268, the management bus 254, the application SMBus driver 270, and the application pass-through driver 274. Data and/or messaging received in the processor application, which may still be encapsulated within Ethernet packets, may be processed via the application Ethernet driver 276, the TCP/IP handler 278, the TLS handler 280, the HTTP(S) handler 282, the WS-Management handier 284, the WS-Management CIM binding handler 286, and/or the CIM profiles handler 288 to extract the WS-Management data and/or messaging.

Outbound WS-Management data and/or messaging, which may be carried via the network traffic 210, may be transmitted via the Ethernet driver 260. WS-Management data and/or messaging may be processed via the CIM profiles handler 288, the WS-Management CIM binding handler 286, the WS-Management handler 284, the HTTP(S) handler 282, the TLS handler 280, the TCP/IP handler 278, and/or the application Ethernet driver 276 to enable encapsulating the WS-Management data and/or messaging to enable transmission. The data may then be forwarded from the application processor 206 to the network controller 202, via the application pass-through driver 274, the application SMBus driver 270, the management bus 254, the network SMBus driver 268, and the pass-through driver 226. The Ethernet driver 260 may then pack the data into Ethernet packets, for example, that may be transmitted via the network traffic 210.

In instances where ASF management traffic may be received and/or transmitted via the system 200, the Ethernet driver 260, the UDP/IP handler 262, the ASF external handler 264, and/or the ASF platform handler 266 may enable processing ASF data and/or messaging received and/or transmitted via the ASF management traffic.

During ASF based operations, the ASF platform handler 266 may utilize the management bus 254, via the network management SMBus 268, to control, manage, and/or query the managed subsystem 252. Additionally, during some ASF based management operations, the ASF platform handler 266 and/or the application ASF platform handler 272 may utilize the management bus 254, via the network SMBus driver 268 and/or the application SMBus driver 270, to interact and/or to control, manage, and/or query, individually and/or collectively, the managed subsystem 252.

The management bus 254 may also be utilized during management operations to enable interactions between the network controller 202, the application processor 206, and/or the managed subsystem 252. For example, during WS-Management based operations, once the received WS-Management data and/or messaging has been extracted, the application processor 206 may utilize the management bus 254, via the application SMBus 270, to control, manage, and/or query the managed subsystem 252. Additionally, in instances where the extracted WS-Management data and/or messaging may necessitate utilizing ASF-based platform functionality, the application processor 206 may utilize the network controller 202, the application SMBus driver 270, the management bus 254, and/or the network SMBus driver 268, to enable performing at least some control, management, and/or query operations of the managed subsystem 252 by invoking necessary ASF-based platform functionality via the ASF platform handler 266.

Figure 3A:
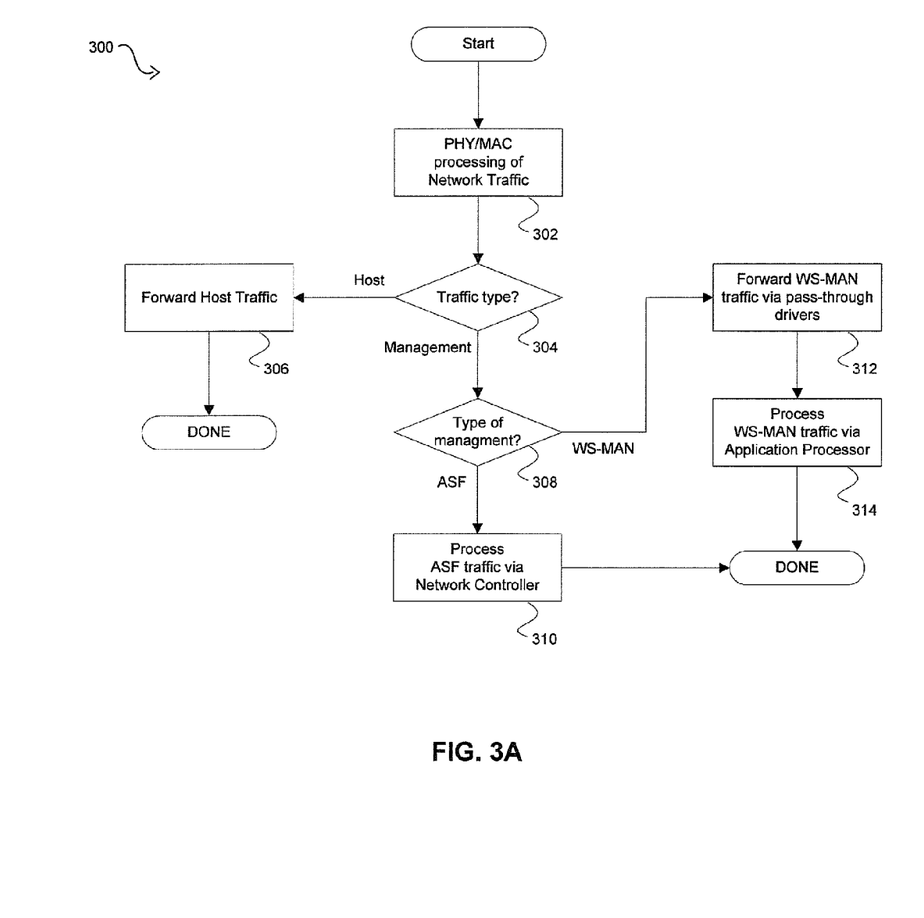
FIG. 3A is an exemplary flow diagram illustrating processing inbound management traffic in a system that utilizes an application processor to enable external processing of WS-Management based traffic in a network controller, in accordance with an embodiment of the invention.

FIG. 3A is an exemplary flow diagram illustrating processing management traffic in a system that utilizes an application processor to enable external processing of WS-Management based traffic in a network controller, in accordance with an embodiment of the invention. Referring to FIG. 3A, there is shown a flow chart 300 comprising a plurality of exemplary steps performed in a system, for example the system 200, to enable external processing of inbound WS-Management in a network controller.

In step 302, the PHY/MAC processing of received network traffic may be performed. For example, the network controller 202 may utilize the PHY interface 222 and/or the MAC processing 224 to perform PHY/MAC processing of Ethernet packets, for example, received via the Ethernet driver 260, which may be carried via the network traffic 210. In step 304, a determination of the type traffic received may be performed in the system 200. In instances where the received network traffic may be determined to comprise host, non-management, traffic, the process may proceed to step 306. In step 306, the received host traffic may be forwarded to the appropriate devices, components, and/or subsystems in the system 200. For example, the network controller 202 may utilize the host interface 228 to forward the received host traffic via the host bus 256.

Returning to step 304, in instance where the traffic may be determined to be management traffic, the process may proceed to step 308. In step 308, a determination of the type of management associated with the received management traffic may be performed. In instances where the management type may be determined to be ASF, the process may proceed to step 310. In step 310, the ASF based traffic may be processed in the network controller 202. For example, the UDP/IP handler 262, the ASF external handler 264, and/or the ASF platform handler 266 may enable processing received ASF traffic in the network controller 202, substantially as described in FIG. 2C.

Returning to step 308, in instances where the management type may be determined to be WS-Management, the process may proceed to step 312. In step 312, the received WS-Management based traffic may be forwarded to an external entity, for example the application processor 206, to enable external processing of the WS-Management. For example, received WS-Management based traffic may be forwarded via the pass-through driver 226 and/or the application pass-through driver 274, via the management bus 256 for example, to enable processing of the WS-Management based traffic in the application processor 206. In step 314, the WS-Management based traffic may be processed in the application processor 206. For example, the application Ethernet driver 276, the TCP/IP handler 278, the TLS handler 280, the HTTP(S) handler 282, the WS-Management handler 284, the WS-Management CIM binding handler 286, and/or the CIM profiles handler 288 may enable processing received WS-Management based traffic in the network controller 202, substantially as described in FIG. 2C.

Figure 3B:
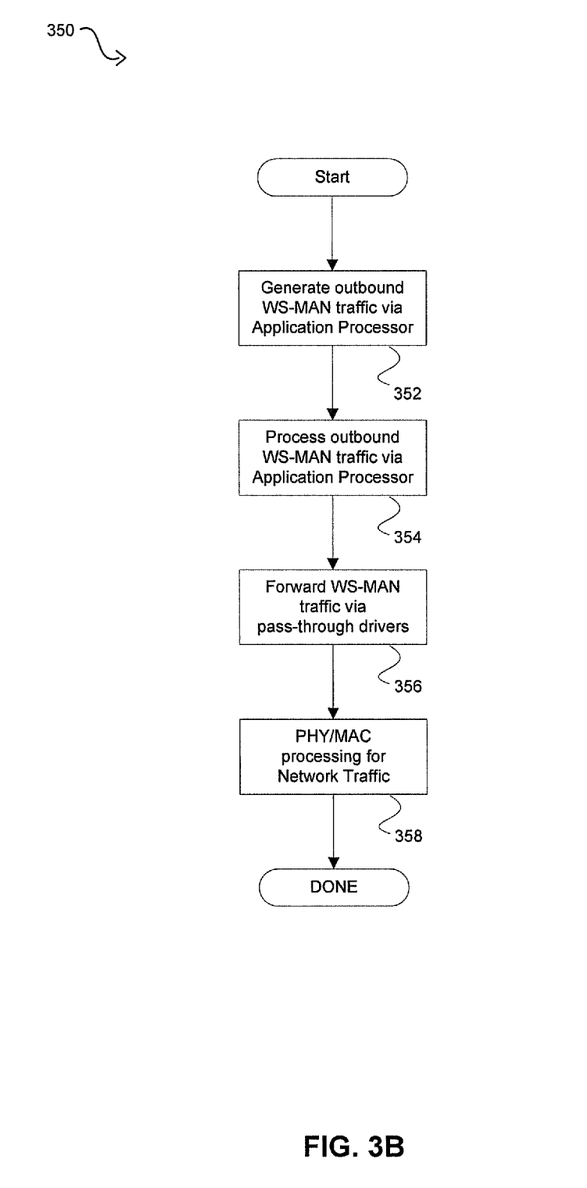
FIG. 3B is an exemplary flow diagram illustrating processing outbound management traffic in a system that utilizes an application processor to enable external processing of WS-Management based traffic in a network controller, in accordance with an embodiment of the invention.

FIG. 3B is an exemplary flow diagram illustrating processing outbound management traffic in a system that utilizes an application processor to enable external processing of WS-Management based traffic in a network controller, in accordance with an embodiment of the invention. Referring to FIG. 3B, there is shown a flow chart 350 comprising a plurality of exemplary steps performed in a system, for example the system 200, to enable external processing of outbound WS-Management in a network controller.

In step 352, WS-Management response traffic may be generated in the application processor 206. For example, after processing inbound WS-Management based messaging received via network controller, substantially as described in FIG. 3A, the application processor may perform necessary operations and/or functionally, and a response message may need be sent back via the application processor 206. Consequently, WS-Management messaging and/or data may be generated in the processor 206 and may need be transmitted via the network traffic 210.

In step 354, outbound WS-Management traffic may be processed in the application processor 206. For example, WS-Management data and/or messaging transmitted from system 200 may be processed via the CIM profiles handler 288, the WS-Management CIM binding handler 286, the WS-Management handler 284, the HTTP(S) handler 282, the TLS handler 280, the TCP/IP handler 278, and/or the application Ethernet driver 276 to enable encapsulating the WS-Management data and/or messaging to enable transmission.

In step 356, processed outbound WS-Management traffic may be forwarded from the application processor 206 to the network controller 202 via pass-through functionality. For example, processed outbound WS-management messaging and/or data may be forwarded via the application pass-through driver 274, the pass-through driver 226, and/or the management bus 256, to enable network processing of the outbound WS-Management based traffic in the network controller 202.

In step 358, the PHY/MAC processing of transmitted network traffic may be performed. For example, the network controller 202 may utilize the PHY interface 222 and/or the MAC processing 224 to perform necessary PHY/MAC processing to enable generating Ethernet packets that may comprise, for example, outbound WS-Management messaging and/or data received from the application processor 206. The generated Ethernet packet may then be transmitted, via the Ethernet driver 260, and may be carried via the network traffic 210.

Figure 4A:
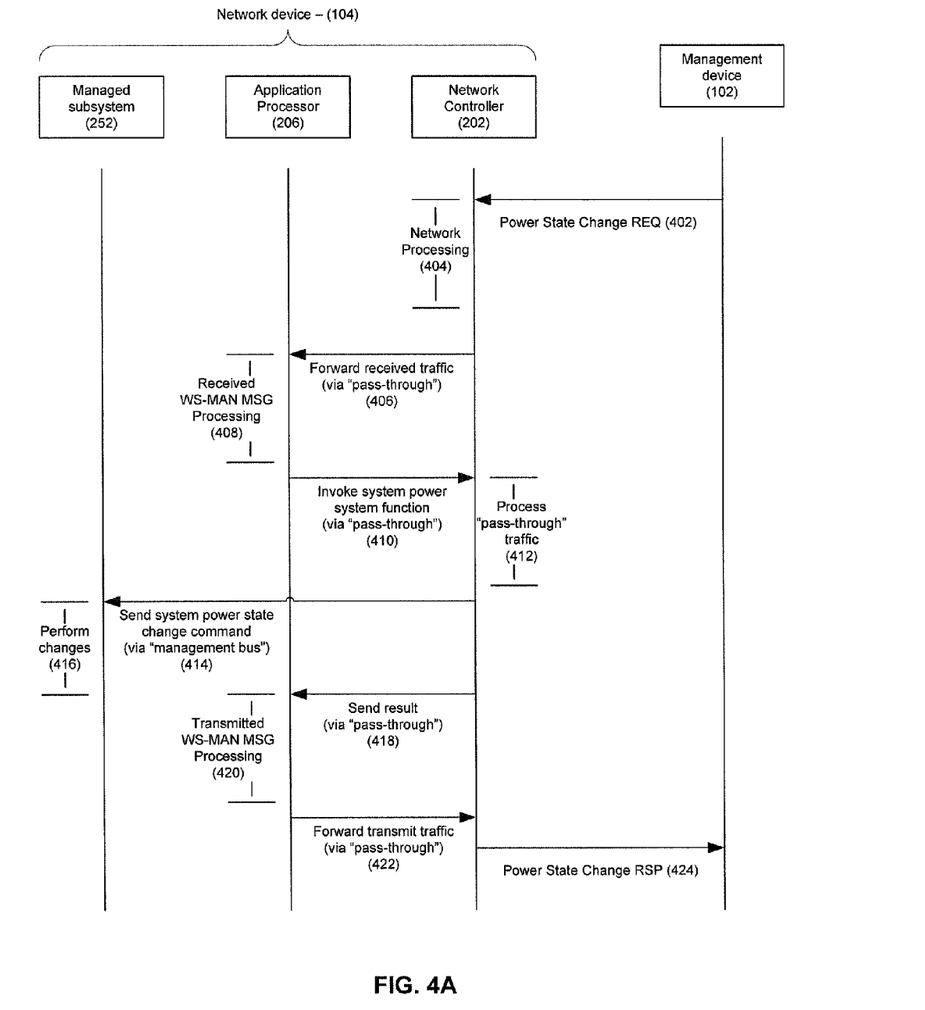
FIG. 4A is a flow diagram that illustrates exemplary messaging during power state change management operation in a system that utilizes an application processor to enable external processing of WS-Management based traffic in a network controller, in accordance with an embodiment of the invention.

FIG. 4A is a flow diagram that illustrates exemplary messaging during power state change management operation in a system that utilizes an application processor to enable external processing of WS-Management based traffic in a network controller, in accordance with an embodiment of the invention. A management device, for example the management device 102, may utilize management connection to perform power state change, utilizing WS-Management based messaging, in a network device, for example the network device 104. The network device 102 may comprise the system 200 to enable external processing of WS-Management based traffic.

In step 402, a Power State Change Request message may send from the management device 102. The Power State Change Request message may be sent via WS-Management based traffic, which may substantially be based on the WS-Management stack 150, and may be transmitted via one or more network packets, which may be carried via the network traffic 210 for example. In Step 404, the network controller 202 may receive the network traffic 210, and may perform initial network processing. For example, the Ethernet driver 260, the PHY interface 222, and/or the MAC processing block 224 may enable initial network processing in the network controller 202. In step 406, where the received network traffic may be determined to be WS-Management based traffic, it may be forwarded to the application processor 206, via pass-through functionality, which may comprise, for example, the pass-through driver 226, the management bus 254, and/or the application pass-through driver 274. In step 408, the received WS-Management based traffic may be processed in the application processor 206. For example, the application Ethernet driver 276, the TCP/IP handler 278, the TLS handler 280, the HTTP(S) handler 282, the WS-Management handler 284, the WS-Management CIM binding handler 286, and/or the CIM profiles handler 288 may enable extracting the received WS-management based data and/or messaging from the forwarded pass-through traffic.

In step 410, once the received message is determined to be a Power State Change Request message, which may require utilizing ASF-based platform functionality, the application processor 206 may invoke system power state function in the network controller 202, via the pass-through functionality. In step 412, the network controller 202 may process the pass-through traffic received from the application processor 206, and may perform necessary operations and/or changes pertaining to power state changes. In step 414, the network controller 202 may send a system power state change command, via the management bus 254, to the managed subsystem 252 to effectuate the necessary changes. In step 416, the managed subsystem 252 may perform necessary operations and/or changes to effectuate necessary changes, in a chipset for example, based on received command from the network controller 202.

In step 418, the network controller 202 may send, via the pass-through functionality, a result message to the application processor 206 to indicate the outcome of processing the system power state function invocation. In step 420, a Power State Change Response message, that may be transmitted to the management device 102 via WS-Management based traffic for example, may be generated and/or processed in the application processor 206. For example, the application Ethernet driver 276, the TCP/IP handler 278, the TLS handler 280, the HTTP(S) handler 282, the WS-Management handler 284, the WS-Management CIM binding handler 286, and/or the CIM profiles handler 288 may enable encapsulating the transmitted Power State Change Response, substantially based on the WS-Management stack 150. In step 422, the generated WS-Management based traffic may be forward from the application processor 206 to the network controller 202, via the pass-through functionality. In step 424, the network controller 202 may transmit the WS-Management based traffic via Ethernet packets that may be generated via the Ethernet driver 260 for example, wherein the Ethernet packets may be carried via the network traffic 210.

Figure 4B:
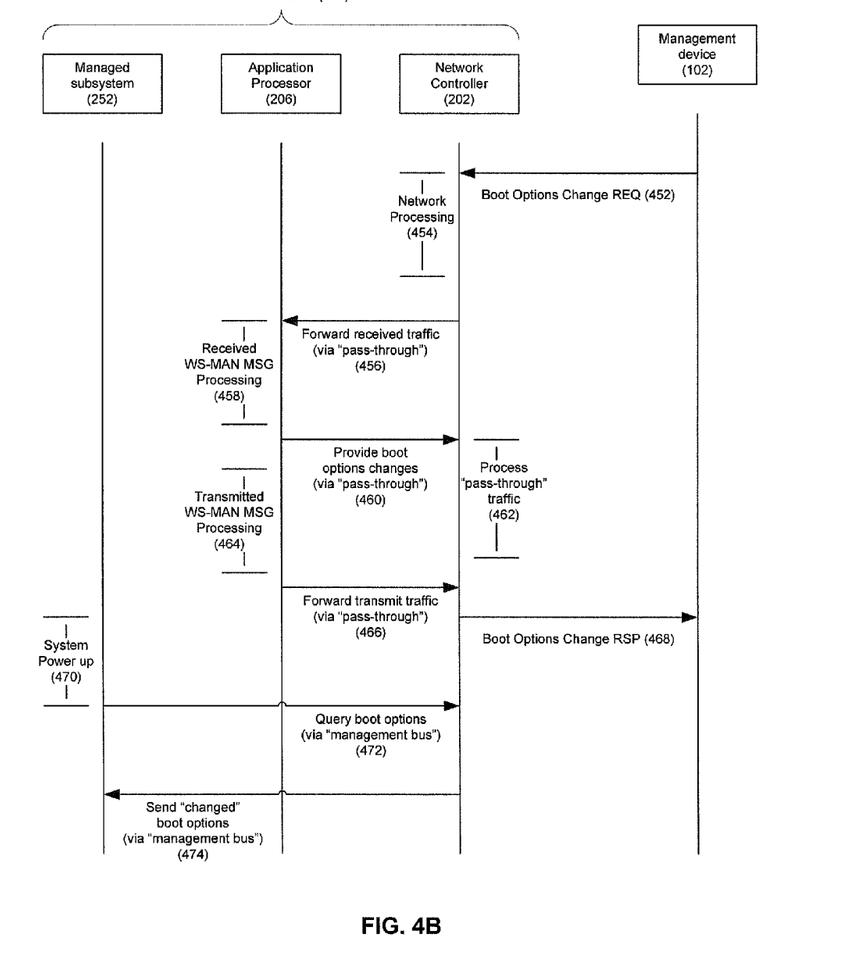
FIG. 4B is a flow diagram that illustrates exemplary messaging during boot options change management operation in a system that utilizes an application processor to enable external processing of WS-Management based traffic in a network controller, in accordance with an embodiment of the invention.

FIG. 4B is a flow diagram that illustrates exemplary messaging during boot options change management operation in a system that utilizes an application processor to enable external processing of WS-Management based traffic in a network controller, in accordance with an embodiment of the invention. A management device, for example the management device 102, may utilize management connection to perform boot options change, utilizing WS-Management based messaging, in a network device, for example the network device 104. The network device 102 may comprise the system 200 to enable external processing of WS-Management based traffic.

In step 452, a Boot Options Change Request message may send from the management device 102. The Boot Options Change Request message may be sent via WS-Management based traffic, which may substantially be based on the WS-Management stack 150, and may be transmitted via one or more network packets, which may be carried via the network traffic 210 for example. In Step 454, the network controller 202 may receive the network traffic 210, and may perform initial network processing. For example, the Ethernet driver 260, the PHY interface 222, and/or the MAC processing block 224 may enable initial network processing in the network controller 202. In step 456, in instances where the received network traffic may be determined to be WS-Management based traffic, it may be forwarded to the application processor 206, via pass-through functionality, which may comprise, for example, the pass-through driver 226, the management bus 254, and/or the application pass-through driver 274. In step 458, the received WS-Management based traffic may be processed in the application processor 206. For example, the application Ethernet driver 276, the TCP/IP handler 278, the TLS handler 280, the HTTP(S) handler 282, the WS-Management handler 284, the WS-Management CIM binding handler 286, and/or the CIM profiles handler 288 may enable extracting the received WS-management based data and/or messaging from the forwarded pass-through traffic.

In step 460, once the received message is determined to be a Boot Options Change Request message, which may require utilizing ASF-based platform functionality, the application processor 206 may provide the corresponding boot options changes to the network controller 202, via the pass-through functionality. In step 462, the network controller 202 may process the pass-through traffic received from the application processor 206, and may perform necessary operations and/or changes pertaining to boot options changes. For example, the network controller 202 may cache the received boot options changes, in the network memory 204 for example, to enable the managed subsystem 252 to query the changes when necessary.

In step 464, a Boot Options Change Response message, that may be transmitted to the management device 102 via WS-Management based traffic for example, may be generated and/or processed in the application processor 206. For example, the application Ethernet driver 276, the TCP/IP handler 278, the TLS handler 280, the HTTP(S) handler 282, the WS-Management handler 284, the WS-Management CIM binding handler 286, and/or the CIM profiles handler 288 may enable encapsulating the transmitted Boot Options Change Response, substantially based on the WS-Management stack 150. In step 466, the generated WS-Management based traffic may be forwarded from the application processor 206 to the network controller 202, via the pass-through functionality. In step 468, the network controller 202 may transmit the WS-Management based traffic via Ethernet packets that may be generated via the Ethernet driver 202 for example, wherein the Ethernet packets may be carried via the network traffic 210.

In step 470, the system 200 may power up and/or boot up, and the boot options may be determined. In step 472, the managed subsystem 252 may query boot options, via the management bus 254, from the network controller 202 to determine boot options that may be utilized within the managed subsystem 252 during system 200 power up. In step 474, the network controller 202 may send the changed boot options, via the management bus 254, to the managed subsystem 252 to enable effectuating the necessary changes during the system 200 power up.

Various embodiments of the invention may comprise a method and system for a distributed platform solution for supporting CIM over web services based management. In system 200, which may be integrated into the management device 102 and/or the network device 104 which may participate in management operations, a portion of management traffic, carried via the network traffic 210, and received and/or transmitted via the network controller 202, may be processed externally to the network controller 202. The pass-through driver 226 may be utilized, in the network controller 202, to enable transparent routing of the management traffic 214, which may be processed externally. The management traffic 214 may comprise WS-Management based messaging. Additionally, management traffic that may comprise ASF based messaging may be processed internally in the network controller 202. The application processor 206 may be utilized to perform processing of the management traffic 214. The management bus 254 may be utilized to enable routing of management traffic 214 that may be processed externally to the network controller 202. The management bus 254 may also be utilized to enable interaction with managed components, subsystems, and/or application during processing of management traffic via the network controller and/or the application processor. During management traffic processing, the application processor 206 may invoke, via the management bus 254, and/or the pass-through driver 226 and/or the application pass-through driver 274, platform based functionality that may be maintained via the network controller 202.

Another embodiment of the invention may provide a machine-readable storage, having stored thereon, a computer program having at least one code section executable by a machine, thereby causing the machine to perform the steps as described herein for a distributed platform solution for supporting CIM over web services based management.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for network management, implemented by a network device comprising a network controller, an application processor, and a managed component external to said network controller, the method comprising:
   determining, by said network controller, whether network traffic received at the network controller includes a management message;
   processing, directly by said network controller, the management message when the management message is an Alert Standard Format (ASF) protocol based message; and
   performing, directly by said network controller, at least a portion of management related operations required for handling said management message in accordance with said ASF protocol, said management related operations comprising configuring said managed component, modifying operations of said managed component, or obtaining information from said managed component; and
   routing, via a pass-through driver in said network controller, the management message to said application processor for external handling when the management message is a Web Service Management (WS-Management) protocol based message.

2. The method according to claim 1, comprising performing a physical layer (PHY) processing or a Medium Access Control (MAC) processing corresponding to said network traffic by said network controller.

3. The method according to claim 1, comprising utilizing an application side pass-through driver in said application processor to enable routing of a WS-Management protocol based management message to or from said application processor.

4. The method according to claim 1, comprising routing said WS-Management protocol based management message via a communication bus between said network controller and said application processor.

5. The method according to claim 4, wherein said communication bus comprises a System Management Bus (SMBus) or a Peripheral Component Interconnect Express (PCI-E) bus.

6. The method according to claim 4, comprising utilizing said communication bus to support platform operations performed during processing of said network traffic.

7. The method according to claim 6, wherein said platform operations comprise communicating with or management of a Basic Input/Output System (BIOS), a chipset, or a sensor.

8. The method according to claim 6, comprising invoking, utilizing said pass-through driver via said communication bus, one or more functions in said network controller that are operable to perform said platform operations during said external handling of said WS-Management protocol based management message.

9. A system for network management, the system comprising:
   a network controller;
   an application processor; and
   a managed component external to said network controller, the network controller having circuitry configured to
      determine whether network traffic received at the network controller includes a management message;
      process, directly by said network controller, the management message when the management message is an Alert Standard Format (ASF) protocol based message;
      perform, directly by said network controller, at least a portion of management related operations required for handling said management message in accordance with said ASF protocol, said management related operations comprising configuring said managed component, modifying operations of said managed component, or obtaining information from said managed component; and
      rout, via a pass-through driver in said network controller, the management message to said application processor for external handling when the management message is a Web Service Management (WS-Management) protocol based message.

10. The system according to claim 9, wherein said network controller circuitry is configured to perform a physical layer (PHY) processing or a Medium Access Control (MAC) processing corresponding to said network traffic.

11. The system according to claim 9, wherein said application processor comprises an additional pass-through driver to enable routing of said remaining portion of a WS-Management protocol based management message to or from said application processor.

12. The system according to claim 9, comprising a communication bus that enables said routing of said WS-Management protocol based management message between said network controller and said application processor.

13. The system according to claim 12, wherein said communication bus comprises a System Management Bus (SMBus) or a Peripheral Component Interconnect Express (PCI-E) bus.

14. The system according to claim 12, wherein said communication bus supports performing platform operations during processing of said network traffic.

15. The system according to claim 14, wherein said platform operations comprise communicating with or management of a Basic Input/Output System (BIOS), a chipset, or a sensor.

16. The system according to claim 14, wherein said network controller circuitry is configured to invoke, utilizing said pass-through driver via said communication bus, one or more functions in said network controller that are operable to perform said platform operations during said external handling of said WS-Management protocol based management message.

17. A network device, comprising:
   a plurality of managed components, wherein said plurality of managed components are subjected to management related operations in accordance with two or more management protocols supported by said network device, wherein: said management related operations comprise configuring one or more of said plurality of managed components, modifying operations of one or more of said plurality of managed components, or obtaining information from one or more of said plurality of managed components;

said management related operations are performed based on interactions between said network device and a remote management device;

an application processor a network controller having circuitry configured to determine whether network traffic received at the network controller includes a management message;

process, directly by said network controller, the management message when the management message is an Alert Standard Format (ASF) protocol based message;

perform, directly by said network controller, at least a portion of management related operations required for handling said management message in accordance with said ASF protocol, said management related operations comprising configuring said managed component, modifying operations of one or more of said plurality of managed components, or obtaining information from said one or more of said plurality of managed components; and rout, via a pass-through driver in said network controller, the management message to said application processor for external handling when the management message is a Web Service Management (WS-Management) protocol based message.

18. The network device of claim 17, wherein said plurality of managed components comprises a Basic Input/Output System (BIOS), one or more chipsets, or one or more sensors.

\* \* \* \* \*